July 12, 1949.   J. E. BROYLES   2,475,813
AIRCRAFT PROPELLING MECHANISM
Filed Aug. 15, 1944   5 Sheets-Sheet 1
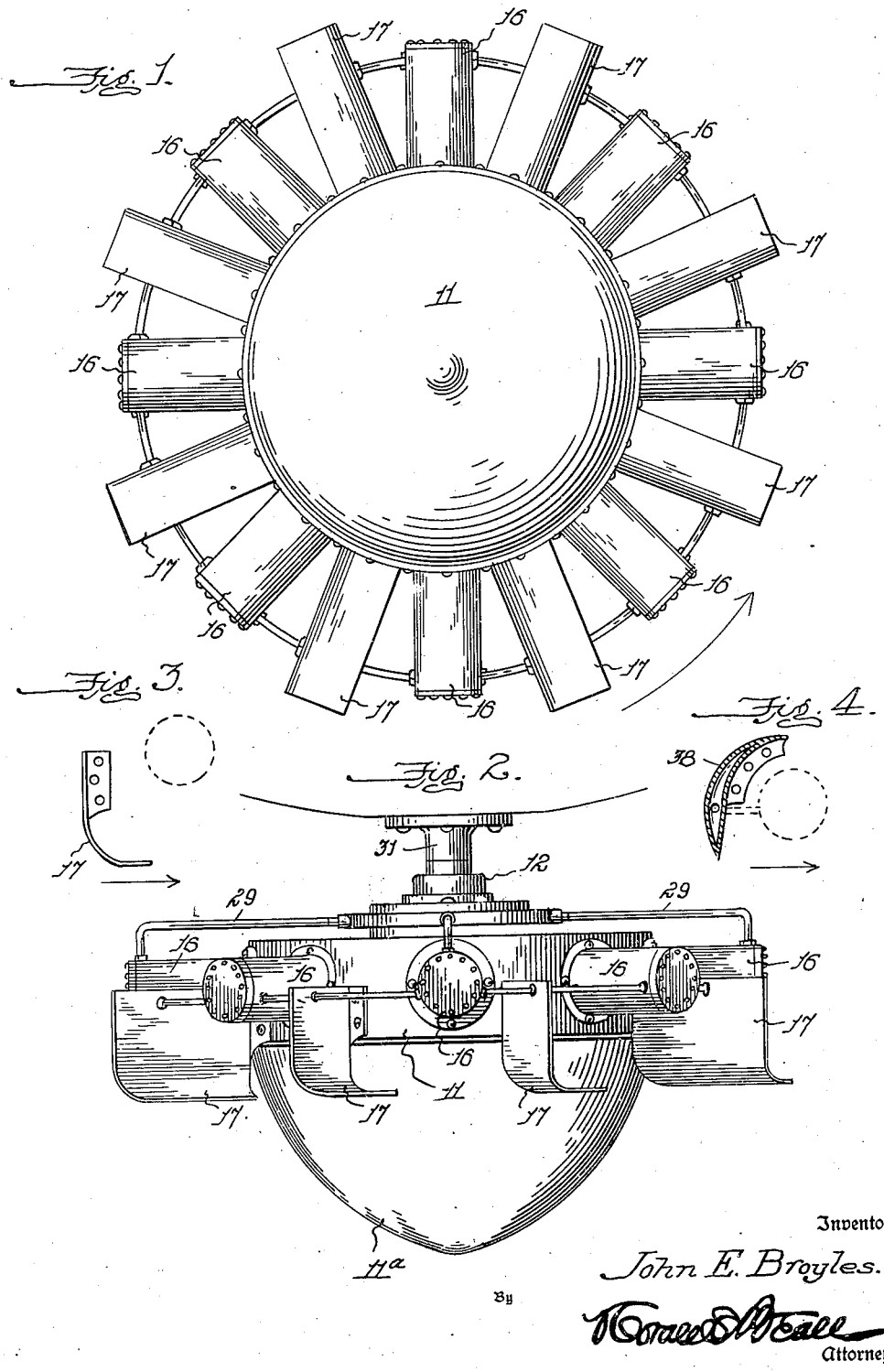
Inventor:
John E. Broyles.

July 12, 1949.  J. E. BROYLES  2,475,813
AIRCRAFT PROPELLING MECHANISM
Filed Aug. 15, 1944  5 Sheets-Sheet 2
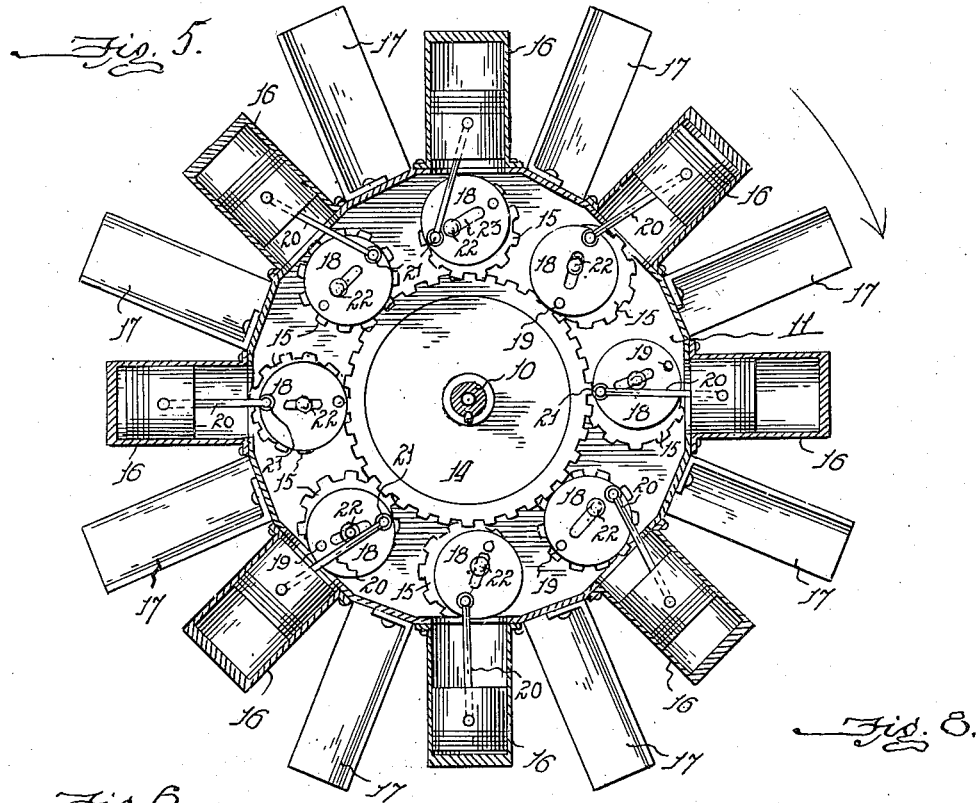
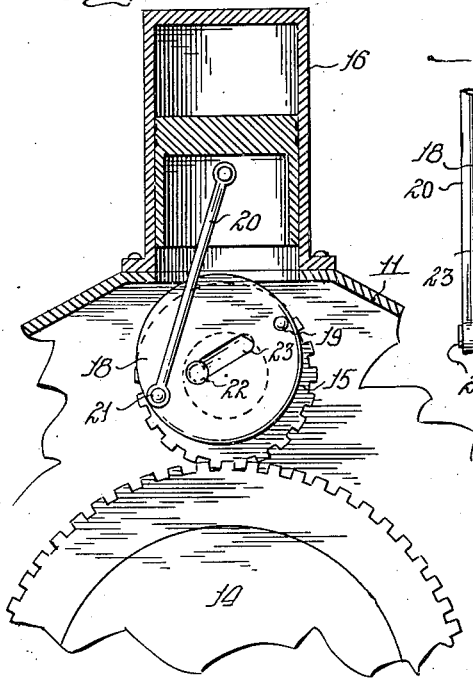
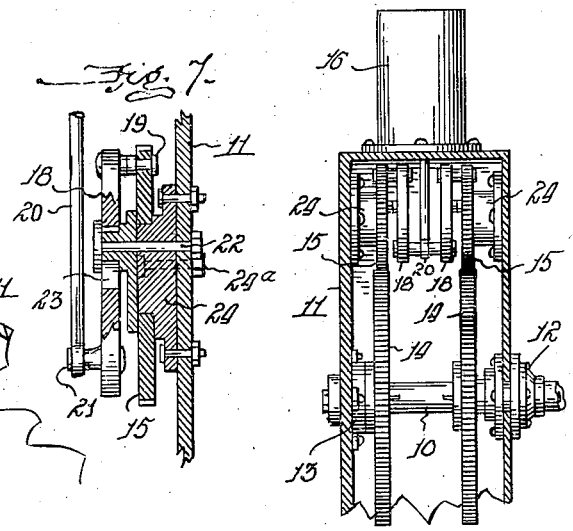
Inventor
John E. Broyles.
By
Thomas B. Beall
Attorney July 12, 1949.   J. E. BROYLES   2,475,813
AIRCRAFT PROPELLING MECHANISM
Filed Aug. 15, 1944   5 Sheets-Sheet 3
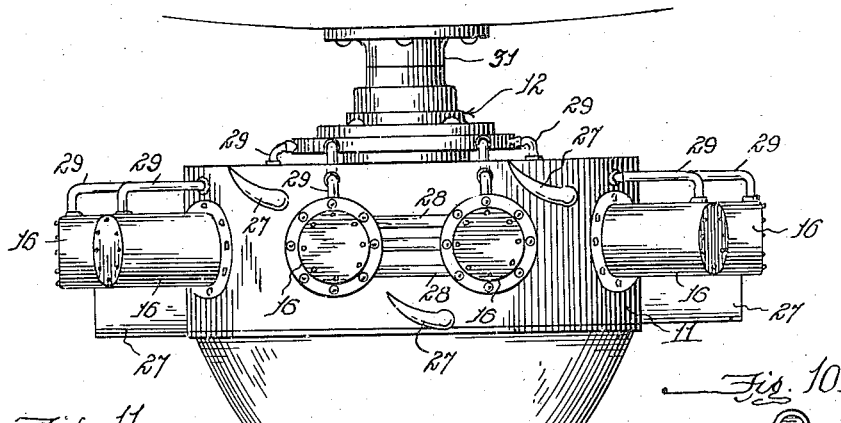
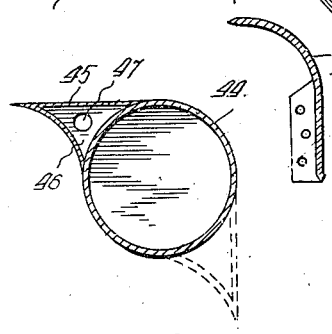
Inventor:-
John E. Broyles.
By
Attorney.

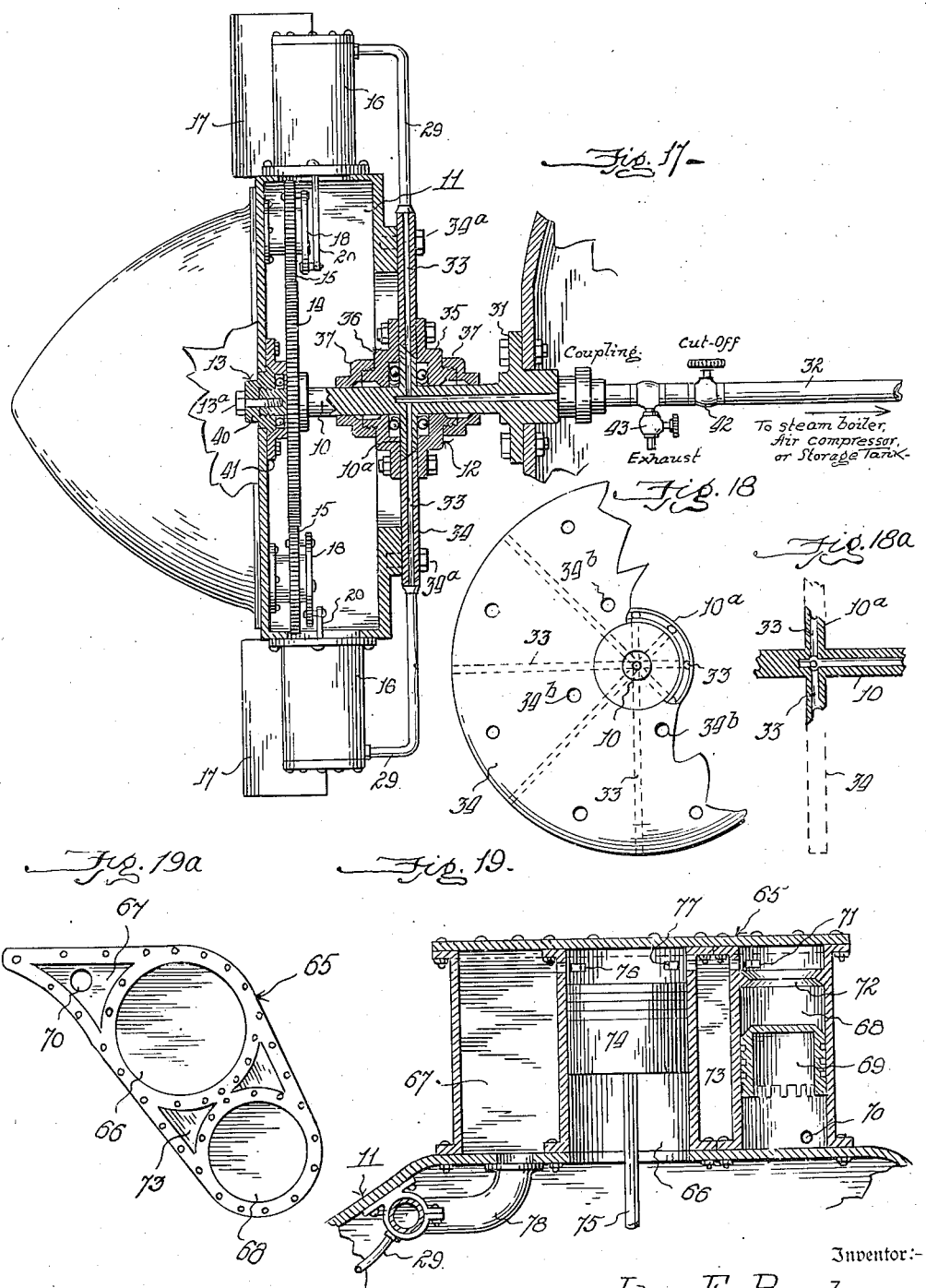

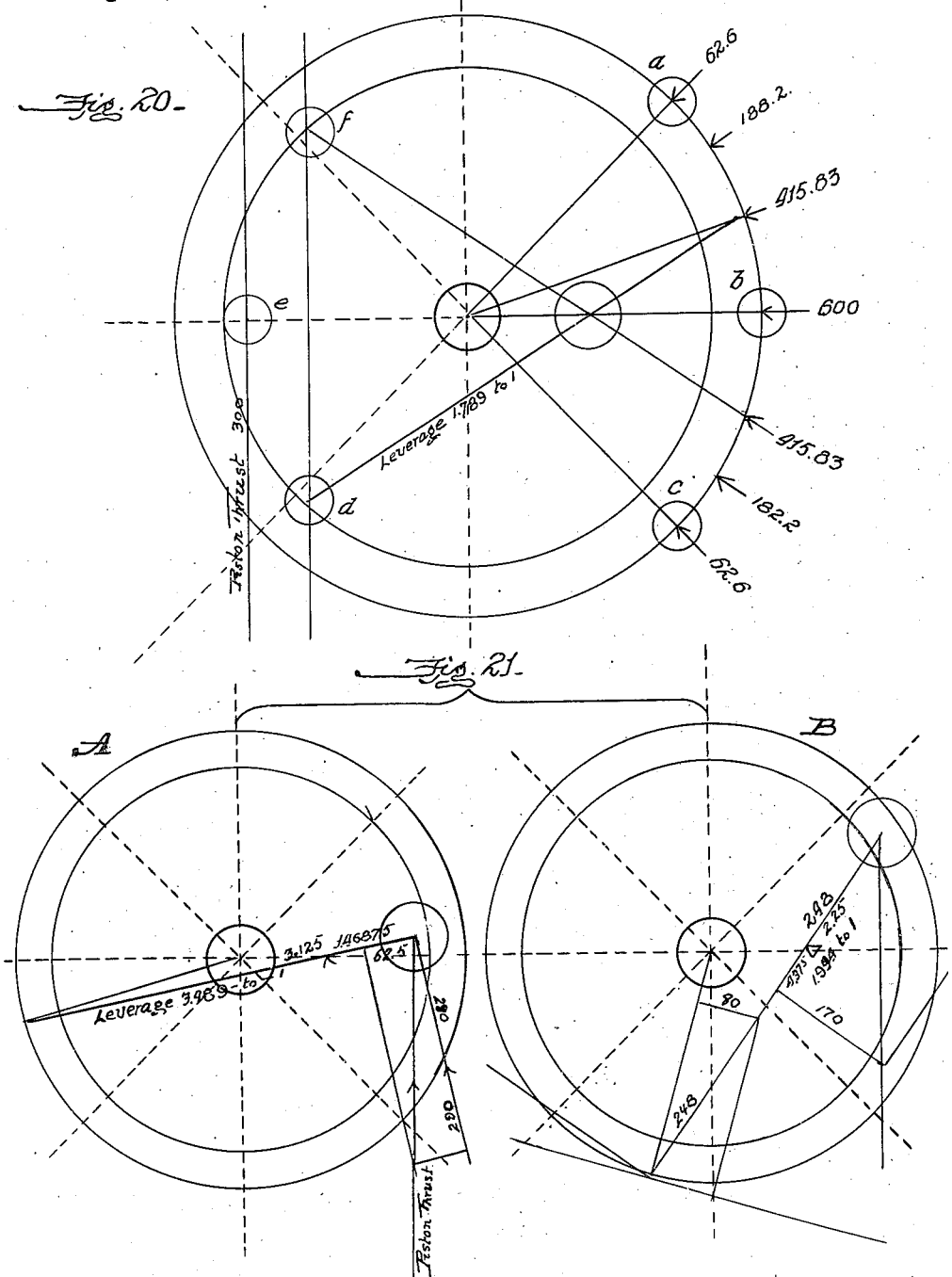

Patented July 12, 1949

2,475,813

UNITED STATES PATENT OFFICE 2,475,813

AIRCRAFT PROPELLING MECHANISM

John E. Broyles, Natick, Mass.

Application August 15, 1944, Serial No. 549,583

4 Claims. (Cl. 170—135.7)

My invention relates to aircraft propulsion, with particular reference to propelling mechanism for airplanes in which the driving motor comprises a multiple cylinder engine rotatable around a common axis for the operation of propeller blades associated therewith, and includes an adaptation for that purpose of the transmission mechanism for reciprocating engines forming the subject-matter of my prior Patent No. 2,375,748, dated May 15, 1945, for Transmission mechanism for reciprocating engines.

The main object of my present invention is to provide a particular construction of aircraft propelling mechanism wherein the multiple cylinder engine and associated transmission gear cooperate with the companion cylinders and propeller blades to produce maximum efficiency in the propulsion of the aircraft, not only as to the efficiency of the driving motor but also in respect to a smooth unretarded flow of the air currents induced by the propeller blades—the latter being preferably extended beyond the plane of the outer ends of the adjacent engine cylinders to further increase their efficiency.

This invention also contemplates the provision of a casing surrounding each cylinder, or a contiguous pair of cylinders, and of such shape as to form a propeller and thereby dispense with the employment of auxiliary blades; said casings also providing chambers for more effectively supplying fluid pressure to the cylinders of the reciprocating engines for the operation of the driving motor.

Other objects in view, as well as other important functions in the operation of the propulsion mechanism will hereinafter appear in the following description of construction and operation, and what I claim as new, and desire to protect by Letters Patent is more specifically set forth in the appended claims.

In the accompanying drawings:

Fig. 1 is a front elevation of aircraft driving mechanism in accordance with my invention, illustrating the arrangement in which propeller blades are employed in connection with the cylinders of the reciprocating engines;

Fig. 2 is a plan view thereof;

Fig. 3 is a detail view of one of the propeller blades;

Fig. 4 is a similar view illustrating a modification of the blade to also provide for conducting fluid pressure to the engine cylinders.

Fig. 5 is a vertical sectional view through the engine cylinders and circular casing enclosing the transmission gear;

Fig. 6 is an enlarged detail view of one of the reciprocating engines and transmission gear therefor;

Fig. 7 is a detail sectional view of the means for mounting certain elements of the transmission gear in the casing;

Fig. 8 is a similar view to illustrate a modification of the transmission gear;

Fig. 9 is a modification in the arrangement of the propeller blades with respect to the engine cylinders;

Fig. 10 is a modified form of propeller blade construction;

Fig. 11 to 15 inclusive show the employment of casings in connection with the engine cylinders to form propellers;

Fig. 16 is a detail view of one of the engine cylinders used in connection with the casing;

Fig. 17 is a vertical sectional view illustrating the arrangement of the reciprocating engines and transmission mechanism, including means for supplying fluid pressure to the engine cylinders from a source of supply (not shown) located in the fuselage of the airplane;

Fig. 18 is an elevation view of an element of the fluid pressure supply conduit; Fig. 18a is a detail sectional view thereof;

Fig. 19 is a vertical sectional view of fluid supply mechanism that may be employed in connection with the engine cylinders; Fig. 19a is a top plan view of the same with the top of the casing removed; and Figs. 20 and 21 are diagrammatic views to illustrate the operations of the pistons in applying power to the lever-wheels of the transmission gear.

In carrying out this invention the cylinders of the reciprocating engines are disposed in spaced apart relation around the circumference of a cylindrical casing or crank-case enclosing the transmission mechanism after the manner shown and described in my co-pending application referred to hereinabove; but in this instance instead of the reciprocating engines and transmission gear driving a central shaft through the medium of a large gearwheel turning with the shaft the large gearwheel and shaft are held stationary and the reciprocating engines with the transmission gear and crank-case revolve around the gearwheel—the small gearwheels of the transmission gear travelling around and in mesh with the toothed periphery of the large gearwheel to turn the crank-case for the operation of the propeller blades projecting radially therefrom.

Referring to the drawings, the center shaft 10—projecting from the fuselage of the airplane—is held stationary, and a crank-case 11, revolving around the same, is provided with suitable bearing boxes 12, 13 bolted to its side pieces; while the large gearwheel 14 is keyed to the shaft and held stationary thereby so that the small gearwheels 15 of the transmission gear, in mesh with the large gearwheel, will be driven to progress around the latter and turn the crank-case which carries the engine cylinders 16 and propeller blades 17 projecting from the circumference thereof to operate in the propulsion of the aircraft.

The transmission gear associated with each reciprocating engine includes in addition to the gearwheel 15 a lever-wheel 18, and these wheels, located side by side, are connected together by a pin 19 near the outer edges thereof—the lever-wheel being turned by piston-rod 20 connected thereto by pin 21 at the edge thereof opposite the connecting pin 19. Now to provide for a shifting movement of the lever-wheel so that greater leverage will be applied on the outstroke or power stroke of the piston said lever-wheel is mounted on a stub-shaft 22 through the medium of a diametrical slot 23 into which the stub-shaft projects from a large bearing 24 on which the gearwheel 15 is mounted for rotation; it being noted that the stub-shaft projects from the bearing at one side of the center or axis of the gearwheel and that the diametrical slot is also at one side of the center or axis of the lever-wheel, with the connections 19 and 21 on a line with the slot; whereby the change of location of the fulcrum in the slot during the turning of the lever-wheel by the piston-rod will apply greater leverage on the lever-wheel during the power stroke of the piston than on the return or compression stroke. When this large gearwheel is employed in connection with an 8-cylinder engine (shown in Fig. 5) the timing of the strokes of the pistons—one with respect to another—should be regulated so that the power stroke of one or more will assist in the return stroke of one or others, for the reason there is a cooperation of the transmission gears of the reciprocating engines with the large gearwheel as the small gearwheels are in mesh with the large gearwheel; that is to say, the impulse of the power stroke on one or more of the small gearwheels is indirectly applied to the others by its operation in turning the crank-case around the stationary gearwheel with which all the small gearwheels are in mesh and in the operation of the driving mechanism are turned under the influence of the large gearwheel in addition to the kinetic force applied to the lever-wheels by the pistons. Thus the operation of the several reciprocating engines is implemented to augment the power for rapidly revolving the propellers. The diagrammatic views (Figs. 20 and 21), hereinafter explained, show examples of the timing of the transmission gears of the reciprocating engines.

The large bearing for the gearwheel 15 is bolted to one of the side pieces of the crank-case (Fig. 7), and is provided with a boss 25 through which the stub-shaft 22 passes, with a spacing collar 26 interposed between the boss and lever-wheel to ease the shifting movement of the latter, and the pin connections between the wheels 15 and 18, and piston rod to the lever-wheel are headed to insure proper alignment. Although I have illustrated in Fig. 17 a transmission gear for each reciprocating engine as comprising a single lever wheel and gearwheel—at one side of the reciprocating piston-rod—I may, and preferably will, employ these elements at opposite sides of the piston rod, as shown in Fig. 8, so as to balance the operation of the transmission gears in relation to the strokes of the piston.

Instead of locating the propeller blades between the engine cylinders (Figs. 1 and 2) I may arrange them in circumferential series as shown in Fig. 9, wherein they are referred to by the numeral 27, and in this instance an adjoining pair of cylinders are connected by communicating pipes 28 cooperating with the feed pipe 29 from any source of fluid pressure suitably located in relation to the cylinders.

Any preferred form of bearing boxes may be employed for mounting the crank-case on the supporting shaft, and likewise in respect to means for conducting fluid pressure from a source (not shown), but preferably located in the fuselage of the aircraft. An example of these elements of construction is illustrated in Fig. 17, of the drawings, from which it will be seen that the stationary shaft—supported in a bracket 31 integral therewith and bolted to the front wall of the fuselage— is hollow or provided with a bore extending from the main supply pipe 32 to a point within the bearing box where it communicates with radial passageways 33 in a disk 34 bolted between the parts 35 and 36 of the bearing box 12 and connected to the crank-case by short bolts or studs 34ª, with the feed pipes 29 connected to the passageways at the periphery of the disk. As will be noted the disk revolves around an annular boss 10ª formed integrally with the shaft—with the engaging surfaces at an angle—and that the boss is located between ball bearings confined within the bearing box. The parts 35 and 36 of the bearing box—rotatable on the shaft—are bolted to the opposite sides of the turnable disk 24, through holes 24ᵇ therein, and this bearing box includes gland nuts 37, 37 located at the outer ends thereof. To accommodate the bearing box the inner side of the crank-case is cut away and reinforced around the opening to receive the aforementioned short bolts or studs which supplement the connection of the turnable disk and crank-case with the associated parts rotatable on the shaft; while the outer end of the shaft, which supports the bearing box 13, is threaded into the stationary part 40 of this bearing and the connection secured by bolt 13ª, with the part 41 bolted to the outer wall of the crank-case—ball bearings being interposed to provide a thrust bearing at the outer end of the shaft in respect to the pulling force exerted on the shaft in the driving of the aircraft by the propellers carried by the crank-case. As the part 41 of bearing 13 turns with the crank-case to which it is bolted and the adjoining gearwheel 14 is stationary on the shaft to which it is keyed these parts are spaced to leave a clearance, inasmuch as one is rotatable while the other remains stationary for the operation of the transmission gears functioning to revolve the crank-case.

The feed pipes 29 may pass through the crank-case (see dotted lines Fig. 9) instead of entirely outside of the same, and as a further modification that portion of each feed pipe extending parallel with the engine cylinders may be dispensed with by employing hollow propeller blades 38 as shown in Fig. 4, with the supply pipes from the passageways in the disks connected to openings 39 in the periphery of the crank-case at the lower ends of the hollow propeller blades, and contemplates the location of the disk 34 and companion annular boss 10ª at the inner side of the front wall of the crank-case when a single set of transmission gears is employed; it being observed that in Fig. 8—showing two sets of transmission gears—I have not included means, such as hereinbefore described, for feeding fluid pressure to the engine cylinders as any other means for this purpose may be employed.

The supply of fluid pressure to the cylinders of the reciprocating engines is regulated by a cut-off valve 42 and exhaust valve 43 associated with the main supply pipe leading to the bore in the stationary shaft, and of course these valves are located in the fuselage of the aircraft; the operation of the cut-off valve with the exhaust valve closed effecting regulation in the speed of the aircraft while the closing of the cut-off valve and opening of the exhaust valve will stop operation of the engines.

The operation of that form of my invention hereinbefore described will be readily understood, inasmuch as it is obvious that the turning of the crank-case through the medium of the reciprocating engines, transmission gear and stationary gearwheel will cause the propeller blades carried by the crank-case to catch the air and drive the aircraft forward after the manner of propeller blades ordinarily employed; in this instance the cylinders of the reciprocating engines cooperating with the propeller blades by directing the air currents expelled from the blades around the rear of said cylinders to thereby implement the forward movement, augmented by the additional contact area of that portion of each blade which projects beyond the plane of the outer ends of the cylinders. Furthermore, the engine is an important desideratum in the construction of an aircraft, and therefore my improved construction of 8-cylinder engine adds materially to the operation of other elements of construction of my improved propelling mechanism. Consequently I have illustrated in the diagrammatic views Figs. 20 and 21 the operation of the transmission gears, from which it will be observed that the shifting of the lever-wheel on its fulcrum—in response to the operation of the piston—effectively applies power in respect to both the power and compression strokes of the piston in the operation of the engine and driving of the gearwheels in mesh with the stationary gearwheel—the proportions being susceptible of variation by changes in the distance between centers and corresponding changes in the diameters of the wheels. In any event the effective application of power is approximately 100° on the power stroke, that of each piston being transmitted to the others successively by the timing of the operation of the reciprocating engines of the 8-cylinder motive power, regulated in such manner that the power stroke of one or more pistons will aid in the return stroke of the others. As illustrated in diagrammatic view Fig. 20, and assuming a predetermined disposition of centers and size of connected wheels, including the intermeshing gearwheels, the power stroke begins to be effective at $a$ (approximately 62.6 pounds pressure) and gradually increases to point $b$, where the greatest amount of pressure is applied (estimated at 600 pounds) and then declines to the point $c$, approximately 62.6 pounds pressure—the shifting of centers from $x$ to $y$ having its effect on the return indicated by $d, e, f$. That is to say the ratio of power application on the power stroke of one of the pistons transmits comparatively greater force to the compression stroke of one or more of the other pistons through the medium of the transmission gear including the stationary gearwheel, for the reason that during the compression stroke—under the influence of the power stroke of a companion piston-rod—the connection between the piston-rod and lever-wheel is nearer the fulcrum of the latter, and accordingly maximum power is applied to the companion transmission gears, for the turning of the crank-case, through the entire range of travel of the gearwheels 15 in mesh with the stationary gearwheel—the greater leverage of the lever-wheel on the power stroke being applied directly to its companion rotatable gearwheel and also indirectly—by means of the gearing including the stationary gearwheel—to other rotatable gearwheels. Consequently the construction of reciprocating engine and associated transmission gear form an important part of the aircraft propelling mechanism constructed in accordance with my invention by cooperating to turn the crank case and propeller blades carried thereby.

As my invention contemplates various modifications in the construction and arrangement of essential parts I have illustrated in Figs. 11 to 15 inclusive the idea of having the reciprocating engine cylinders of such shape as to provide propeller blades to thereby dispense with the supplemental blades 17—Fig. 11 being an exception in which the cylinder 44 is provided with extension 45 at the rear thereof and in the direction to cooperate with blade 17ᵃ from which it is spaced to provide an additional contact surface as well as a chamber 45 for supplying fluid pressure to the engine cylinder—a fuel supply pipe being connected to the chamber by way of opening 47 in the bottom thereof. This modification also suggests (by dotted lines) the provision of a front extension 45, and in the use of this construction of engine cylinder propeller blade 17ᵃ may be and preferably is omitted.

In Fig. 12 cylinder 48 is provided with an extension or casing 49, similar to 45, and an extension 50 in front of the engine cylinder, the last mentioned extension being reinforced by tube 51; while in Fig. 13 the construction of the casing is somewhat similar—the front extension 52 being like extension 50 but at a different angle, with the extension 53 in the rear extended and reinforced by tube 54. The form of casing in Fig. 14 differs from that illustrated in Fig. 13 in that the front or forward extension 55 projects in like manner to the forward extension in Fig. 12, and the rear extension—reinforced by tube 57—presents a straight outer surface instead of having the opposite sides tapered to a point or vertical edge.

The propeller form of casing illustrated in Fig. 15 contemplates an arrangement of engine cylinders in pairs around the periphery of the crank case; it being understood, of course, that in this instance the reciprocating piston rods of the cylinders operate the respective transmission gear at opposite sides of the stationary gearwheel 14 in the crank-case. Consequently the cylinders 58, 58 are at an angle, being connected at opposite sides by straight walls 59, 59 for deflecting air currents in the operation of the casing as propelling means, and include rearwardly projecting extension 60, tapered to an edge 61, and a similar shaped forwardly projecting extension 62—the inner wall of each extension being slightly curved inwardly for more efficient operation as a propeller. This particular form of propeller casing in addition to increasing the effectiveness of the multiple cylinder engine by a more efficient disposition of the transmission gears presents greater air contact surfaces to permit the casings to be farther spaced apart around the periphery of the crank case without reducing the number of engine cylinders. It will be noted that fluid pressure chambers 63 are provided at opposite sides of each cylinder 58, and that the cylinders, as well as those in respect to the other engine cylinders enclosed by the casings, are provided with inlet openings 64 (Fig. 16) at the upper ends thereof.

It will be obvious the employment of casings in connection with the engine cylinders provide propelling means for driving the aircraft forward, and that the arrangement combines in a single unit an engine cylinder, or cylinders, a propeller blade, and conduits for supplying fluid pressure to the engine cylinders, and is therefore an important modification of the construction in which separate propeller blades are associated with the engine cylinders as illustrated in Fig. 1 of the drawings.

As hereinbefore explained the purpose of the engine cylinder casings is to provide propellers operating in the manner of ordinary airplane propellers, and for the reason that the propeller unit is susceptible of various modifications I have illustrated in Fig. 19 an arrangement in which the casing 65 includes an engine cylinder 66 and fuel supply chambers 67 and 68 at opposite sides thereof, with one of the chambers, 68, serving as an expansion and contraction chamber, and for this purpose it is provided with a free moving piston or diaphragm 69 intermediate its ends with the space in the lower part of the chamber acting as an air cushion supplied with air through opening 70. Upward movement of the piston or diaphragm—under the influence of fluid pressure entering the upper part thereof through opening 71—is limited by seat 72 in the form of a ring around the inner side of the chamber, and as shown chamber 68 is spaced from the engine cylinder by an interposed passageway or chamber 73 between them. The engine cylinder contains piston 74, with its piston rod 75, and is provided with inlet ports 76 leading from chamber 67, and ports 77 leading into chamber 73, as well as with the fuel supply pipe 78 and usual exhaust port (not shown). The purpose of this construction is to provide for rapid introduction of fuel or fluid pressure into the engine cylinder at the proper moment during the operation of the engine, augmented by expansion and contraction of the fuel in chamber 68, thus permitting quick pulsations through the influence of air pressure on the piston or diaphragm. Instead of employing air pressure to influence the expansion and contraction of fluid pressure in chamber 68 a spring may be employed. A valve (not shown) is connected to opening 70, and I prefer one similar to that employed for the inflation of vehicle tires, though the valve will be dispensed with when the feed pipe is connected to an air-compressor.

Other modifications or changes may be made in respect to details of construction, within the spirit and scope of the appended claims.

I claim:

1. Propelling mechanism for aircraft comprising a stationary shaft connected to and projecting from said aircraft and having a bore in the inner end portion thereof connected to a fuel supply on the aircraft, a crank-case mounted on the shaft to revolve around said stationary shaft, a stationary gearwheel keyed to the shaft, cylinders with reciprocating pistons spaced apart around the periphery of the rotatable crank case, conduits for conducting fuel from the hollow shaft to the cylinders, and propeller blades on the crank case in association with the cylinders; together with transmission gear between the pistons and stationary gearwheel, said transmission gear including gearwheels in mesh with the stationary gearwheel to travel around the toothed periphery thereof to turn the crankcase for the operation of the propeller blades in association with the cylinders.

2. Propelling mechanism for aircraft in accordance with claim 1 and in which the transmission gear comprises in addition to the gearwheels a lever-wheel connected to each of said gear wheels near the outer edge thereof, each of said lever-wheels having a diametrical slot through which its fulcrum passes to permit shifting movement of the lever-wheel in the application of power thereto—the piston-rod of the piston being connected to the lever-wheel opposite the connection of the lever-wheel to the small gearwheel on a line with the diametrical slot.

3. Propelling mechanism for aircraft comprising a hollow shaft fixed to and projecting from the aircraft, said hollow shaft communicating with a fuel supply on the aircraft, a stationary gearwheel keyed to the shaft, and a crank-case rotatably mounted on the shaft to revolve around the gearwheel; together with reciprocating pistons in cylinders carried by the crank-case with the cylinders arranged around the periphery of the crank-case in spaced apart relation, propeller blades on the crank-case and associated with the cylinders, and conduits extending from the hollow shaft to the outer ends of the cylinders for supplying fluid pressure thereto.

4. Propelling mechanism for aircraft in accordance with claim 3 and in which the conduits for supplying fluid pressure to the engine cylinders includes a disk on the shaft having radial passageways communicating with the bore of the shaft, and supply pipes extending from the outer ends of the radial passageways to the outer ends of the cylinders.

JOHN E. BROYLES.

REFERENCES CITED

The following references are of record in the file of this patent:

UNITED STATES PATENTS

| Number | Name | Date |
| --- | --- | --- |
| 58,891 | Ruset | Oct. 16, 1866 |
| 346,721 | Cary | Aug. 3, 1866 |
| 460,642 | Kitson | Oct. 6, 1891 |
| 1,057,225 | Decker | Mar. 25, 1913 |
| 1,340,450 | Kleidman | May 18, 1920 |
| 1,452,572 | Prosser | Apr. 24, 1923 |
| 1,529,111 | Bowman | Mar. 10, 1925 |
| 1,529,270 | Pascolini | Mar. 10, 1925 |
| 2,011,061 | Loescher | Aug. 13, 1935 |
| 2,028,526 | Schulman | Jan. 21, 1936 |
| 2,308,380 | Mercier | Jan. 12, 1943 |
| 2,375,748 | Broyles | May 15, 1945 |

FOREIGN PATENTS

| Number | Country | Date |
| --- | --- | --- |
| 14,595 | Great Britain | July 15, 1905 |
| 389,288 | France | Sept. 4, 1908 |
| 397,499 | France | May 8, 1909 |
| 408,033 | France | Mar. 16, 1910 |